May 16, 1967 W. E. SCHOBER ETAL 3,319,858

CARTRIDGE ACTUATED MOVABLE PRESSURE ROLLER FOR MAGNETIC TAPE DRIVING MEANS

Filed Aug. 3, 1964 4 Sheets-Sheet 1

INVENTORS
WAYNE E. SCHOBER
PAUL J. NIELAND
BY Merchant, Merchant & Gould
ATTORNEYS INVENTORS
WAYNE E. SCHOBER
PAUL J. NIELAND
BY Merchant, Merchant & Gould
ATTORNEYS INVENTORS
WAYNE E. SCHOBER
PAUL J. NIELAND
BY Merchant, Merchant & Gould
ATTORNEYS INVENTORS
WAYNE E. SCHOBER
PAUL J. NIELAND
BY Merchant, Merchant & Gould
ATTORNEYS 3,319,858

CARTRIDGE ACTUATED MOVABLE PRESSURE ROLLER FOR MAGNETIC TAPE DRIVING MEANS

Wayne E. Schober, Minneapolis, and Paul J. Nieland, South St. Paul, Minn., assignors to Viking of Minneapolis, Inc., Minneapolis, Minn., a corporation of Minnesota Filed Aug. 3, 1964, Ser. No. 387,073
7 Claims. (Cl. 226—90)

This invention relates generally to improvements in tape handling machines, and more particularly, it relates to an improved tape driving and control mechanism for tape recording and reproducing machines.

In tape machines of the character described herein, the magnetic tape is driven at a constant speed across the transducer heads by means of a power operated rotary capstan and a cooperating idle pressure roller for maintaining the tape in frictional driving engagement with the capstan. In machines of the type designed to handle tape cartridges, mechanism must be provided for moving the idle pressure roller between an operative normally vertically disposed position above the deck of the machine and a generally horizontal inoperative position below the deck of the machine in order to permit the tape cartridge to be slid over the deck to an operative position without interference from the pressure roller. It has normally been the practice to provide some type of a lever mechanism for actuating the pressure roller between its above-noted operative and inoperative positions.

An important object of the present invention is the provision of an improved mechanism for operating the idle pressure roller between its below-deck generally horizontal inoperative position and its above-deck generally vertical tape-driving position which includes an actuator projecting upwardly through an aperture in the deck into the path of travel of a cartridge when inserted into or placed upon the machine, and which mechanism operates the pressure roller between its inoperative and operative positions in response to engagement of the cartridge with said actuator and the subsequent sliding insertive movements of the cartridge on the deck of the machine.

Another object of the present invention is the provision of pressure roller control means for a tape handling machine which includes a novel connecting mechanism for translating the cartridge actuated lineal movement of the actuator into an arcuate swinging or rotary movement of the pressure roller about its swinging axis between its inoperative below-deck position and its operative tape-driving position.

Another object of the present invention is the position of pressure roller control means for a tape handling machine which includes a novel connecting mechanism between the sliding actuator and the rockshaft of the pressure roller which is in the form of a pitman rod whereby the final portion of the pressure roller movement adjacent its operative position is at a relatively slower rate than the preceding pressure roller movement from its inoperative below-deck position, whereby the final movement of the pressure roller into its operative position is at a relatively low velocity so as to reduce the noise, jarring and inertial forces resulting from the operation and engagement of the pressure roller.

Another object of this invention is the provision of first or primary pressure roller control means in a form of a cartridge engaged actuator, as noted above, which is operative to move the pressure roller from its extreme below deck inoperative position to a near operative position disposed closely adjacent the capstan but sufficiently spaced therefrom to produce no frictional driving pressure between the capstan and a tape interposed between the capstan and the pressure roller, and which also includes secondary pressure roller control means which is operative to move the pressure roller between its intermediate near operative position and an operative tape-driving position.

A further object of the present invention is the provision of a novel release mechanism for the pressure roller of a tape handling machine of the type noted above which includes alternative means for releasing the pressure roller to its inoperative position in the form of a pair of release levers one of which is engaged and operated upon upward movement of the tape cartridge away from the deck or cartridge supporting surface and the other of which is arranged for direct manual operation for releasing the pressure roller.

A still further object of the present invention is the provision of speed change means for the capstan of a tape handling machine which includes a novel shift mechanism for changing the position of a drive belt between the spaced grooves of a two-step pulley.

The above and other objects and advantages of this invention will become apparent from a consideration of the following detailed specification, appended claims and drawings.

Referring to the drawings, wherein like reference characters indicate like parts or elements throughout the several views.

Figures 1, 2:
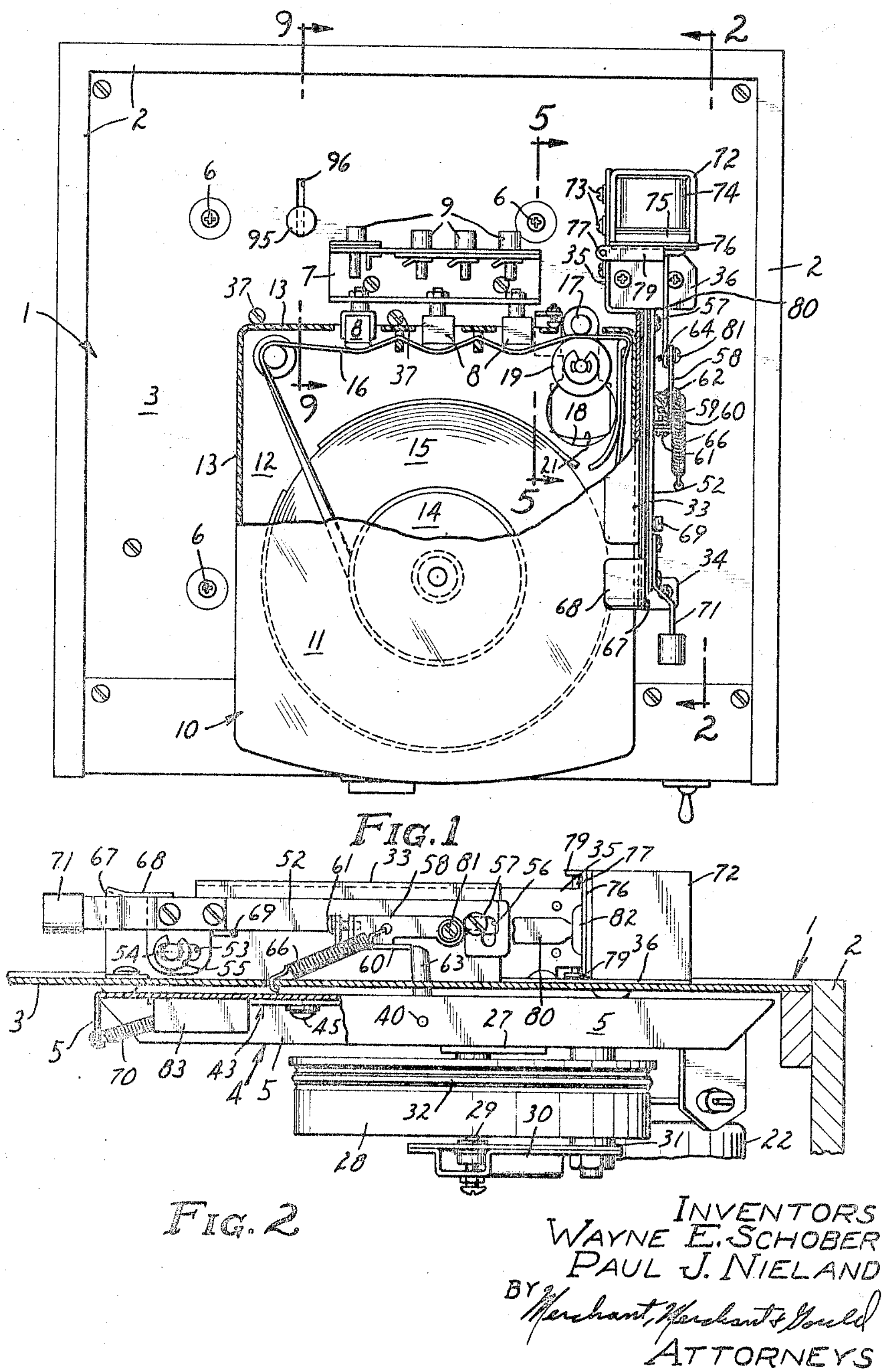
FIG. 1 is a view in top plan of a magnetic tape handling machine embodying the present invention, some parts being broken away and some parts shown in section.
FIG. 2 is an enlarged view in vertical section taken on the line 2—2 of FIG. 1, some parts being broken away.
Figure 3:
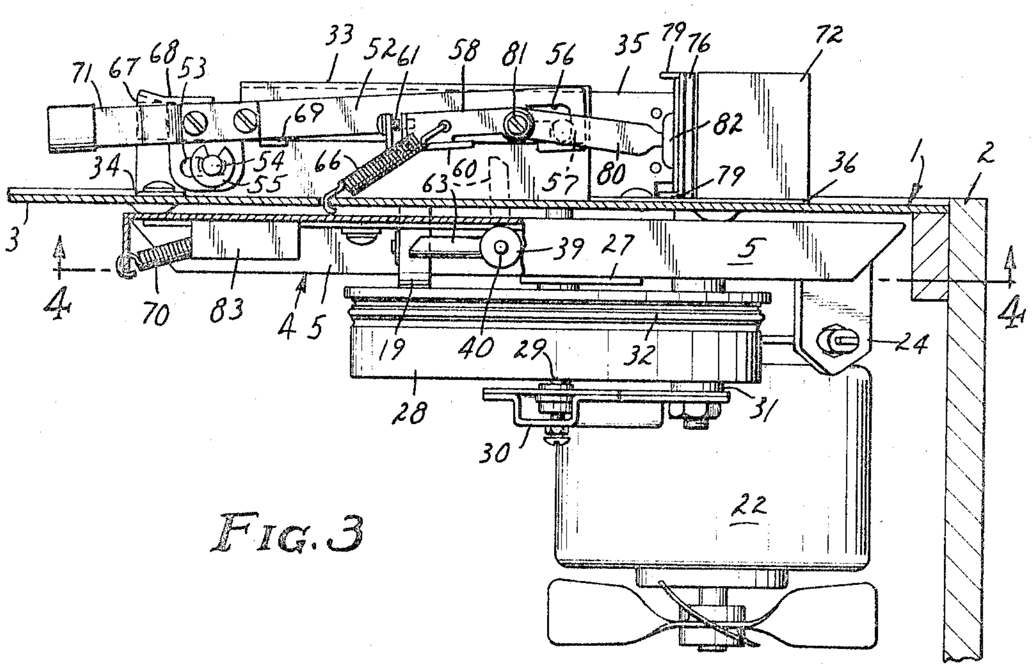
FIG. 3 is a view corresponding to a portion of FIG. 2, but showing some parts thereof in alternative positions.

Referring again to the drawings, the various parts of the tape-handling machine of the present invention are mounted on and supported by a flat deck 1 which forms the upper wall of a cabinet or casing structure which further includes side walls 2. The deck 1 includes a top deck plate 3 seated on the side walls of the cabinet, and further includes a sub-panel 4 supported by the deck plate 3 and depending therefrom. The sub-panel 4 is somewhat pan-shaped and includes downturned side flanges 5, the sub-panel 4 being steered to the top deck-plate 3 by means of screws 6 or the like which are threaded into the sub-panel 4.

In accordance with the usual practice, an elongated cross-sectionally U-shaped head mounting bracket 7 is mounted on the upper surface of the top deck-plate 3 for supporting one or more electro-magnetic transducer heads 8. Three such heads 8 are illustrated, one for example being a recording head, and the others being a reproducing or playback head and an erase head. A plurality of conventional pinjacks 9 are carried by a rear flange of the bracket 7 and are adapted for electrical connection to the windings, not shown, of the transducer heads 8, or for various other desirable connections.

An endless tape cartridge is illustrated in FIG. 1, the same being represented in its entirety by the reference numeral 10. The tape cartridge 10 comprises an outer casing or shell structure including a top wall 11, a bottom wall 12 and a peripheral side wall 13. A reel 14 is mounted for free rotation within the cartridge 10 and carries an endless coil of tape 15 having a playing loop 16 extending from the inner convolution of the coil and being simultaneously rewound or returned to the outer convolution thereof. The tape cartridge 10 is provided in its side wall 13 disposed adjacent the bracket 7 with openings to receive the transducer head 8 and also to receive a power drive capstan 17. The bottom wall 12 of the cartridge 10 defines an aperture 18 adapted to receive an idle pressure roller 19 which cooperates with the cylindrical surface of the capstan 17 for driving or moving the playing loop 16 of the tape 15 from and back to the tape coil and across the arcuate front surfaces of the transducer heads 8. It will be noted that the sub-panel 4 and the top deck-plate 3 define aligned apertures 20, 21 respectively, for passage of the pressure roller 19 between its inoperative and operative positions noted hereinafter, the apertures 20, 21 being aligned with the aperture 18 of the cartridge 10 when the cartridge 10 is in its solely inserted position.

In order to drive the capstan 17 at a constant speed, or at different selected constant speeds, an electric motor 22 is mounted beneath the sub-panels 4 with its drive shaft 23 in a generally vertical position. The motor 22 is mounted by means of a plurality of depending brackets 24, and the drive shaft 23 is provided with a driving pulley 25. The capstan 17 is mounted for rotation on the sub-panel 4 by means of a bearing 26 secured to the sub-panel 4 by means of spaced brackets 27.

A large diameter speed-reducing pulley in the nature of a flywheel 28 is secured to the lower end portion of the capstan 17, and an end bearing 29 supports the lower end of the capstan 17. The end bearing 29 is carried by a supporting bracket 30 secured to the sub-panel 4 by means of a pair of spaced studs 31. An endless resilient drive belt 32 is entrained around an annular groove in the flywheel 28 and the motor pulley 25. As shown in the drawings, the capstan 17 projects through and above the top deck plate 3 and is disposed with its axis generally perpendicular to the playing of the deck plate 3. That is, the capstan 17 projects vertically when the top deck plate 3 is horizontally disposed, it being noted that whereas the tape handling machine shown and described herein may be used in various positions other than the normal horizontal position shown, the terms upper, lower, vertical and horizontal as used herein are employed to describe the relationship of the various elements of this invention when the deck 1 of the machine is in a generally horizontal position.

For the purpose of properly positioning the tape cartridge and with respect to the capstan 17 and the heads 8, an upstanding guide flange 33 is secured to the upper surface of the top deck plate 3. The guide flange 33 defines a front foot 34 which is secured by means of a suitable fastener to the top deck plate 3, and the guide flange 33 also defines an inwardly offset rear portion 35 and a laterally outwardly projecting rear foot 36 also secured to the top deck plate 3 by means of a pair of suitable fasteners. When the pressure roller 19 is retracted to its below deck inoperative position, the tape cartridge may be inserted and removed from the machine by sliding it back and forth on the upper supporting surface of the top plate 3 while the cartridge 10 is maintained in proper alignment against the side of the guide flange 33. The top deck plate 3 is also provided with a pair of upwardly projecting stops 37 against which the front side wall 13 of the tape cartridge 10 is seated or abuts, when the same is in its operative position shown in FIG. 1, the stops 37 therefor establishing the operative position of the tape cartridge 10.

The rubber puck or idle pressure roller 19 is journalled for free rotation on the projecting end of a stub shaft 38 which projects radially from and is rigidly secured to the intermediate portion of a generally horizontally disposed rockshaft 39. The rockshaft 39 is pivotally mounted to the sub-deck 4 for rocking movements whereby the pressure roller 19 is moved about an axis which is generally normal to but radially offset from the axis of the capstan 17. As shown particularly, in FIG. 4, the outer pin end 40 of the rockshaft 39 is pivotally mounted within a bearing aperture defined in the depending side flange 5 of the sub-panel 4, and the inner pin end portion 41 of the rockshaft 39 is pivotally mounted within a bearing aperture defined by a mounting bracket 42 secured to and projecting below the sub-panel 4. This mounting of the pressure roller 19 permits arcuate swinging movements thereof about the axis of the rockshaft 39 toward and away from the capstan 17 between an operative tape-driving position above the tape cartridge supporting surface of the top deck plate 3, wherein the pressure roller 19 presses the playing loop 16 of the tape coil 15 into frictional driving engagement with the capstan 17, and an extreme inoperative generally horizontal position below the top deck plate 3. The complete inoperative position of the pressure roller 19 is illustrated by full lines in FIG. 5, whereas the operative tape driving position thereof is shown by dotted lines in FIG. 5.

Figure 4:
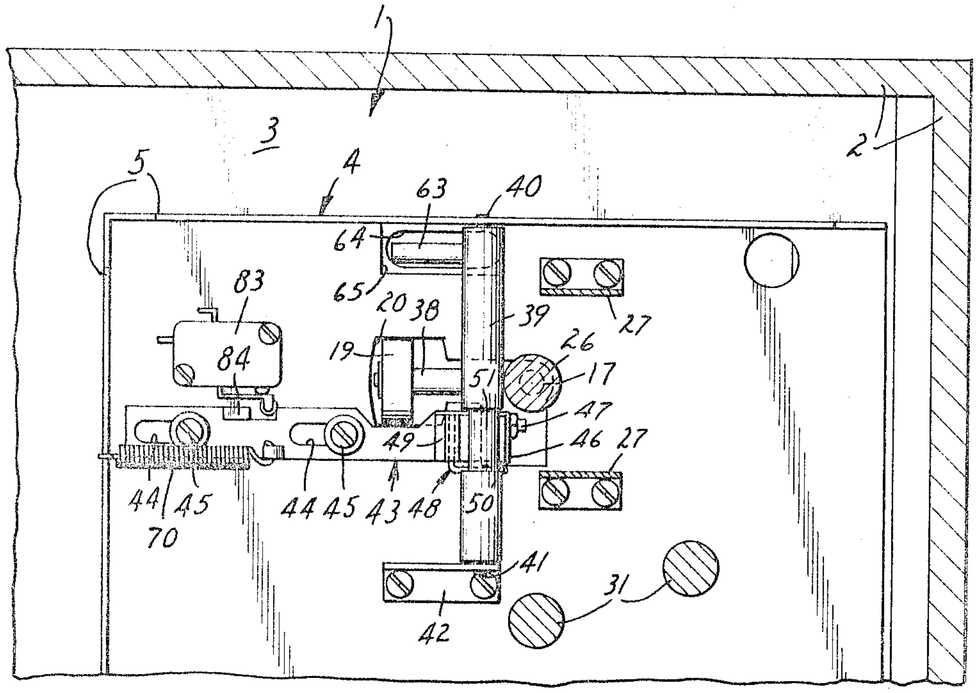
FIG. 4 is a view in section taken approximately on the line 4—4 of FIG. 3 and showing the under part of the deck structure in bottom plan.
Figure 5:
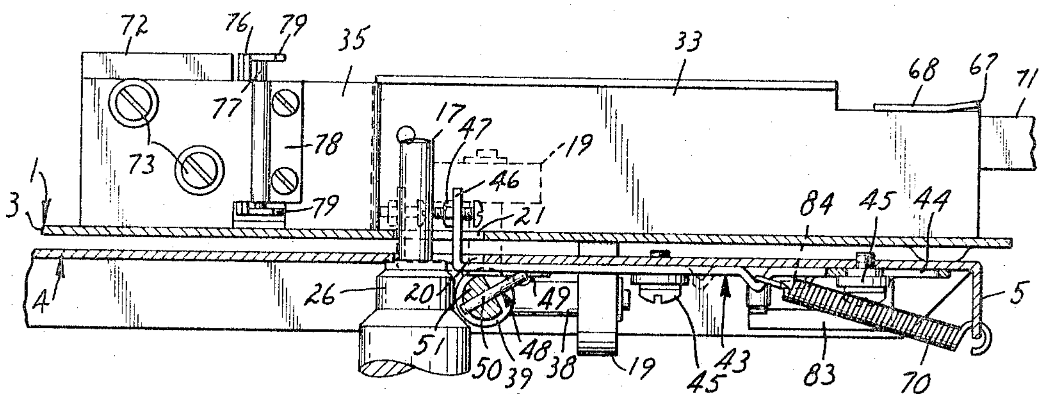
FIG. 5 is an enlarged view in vertical section taken approximately on the line 5—5 of FIG. 1, with alternative positions of some parts being shown by dotted lines.

In accordance with this invention, first or primary pressure roller control means is provided for moving the pressure roller 19 from its complete inoperative below deck position to and releasably retain it in a near operative position, shown by dotted lines in FIG. 6, wherein the pressure roller 19 is disposed closely adjacent the capstan 17 but is sufficiently spaced therefrom to produce no frictional driving pressure between the capstan 17 and the tape-playing loop 16 interposed between the capstan 17 and the pressure roller 19. Such first pressure roller control means comprises an elongated slide bar, represented generally by the reference numeral 43, mounted for slidnig movements beneath the sub-panel 4. As shown in FIGS. 4 and 5, the slide bar 43 defines a pair of elongated longitudinally spaced slots 44 which receive shoulder screws 45 for mounting the slide bar 43 to the sub-panel 4. An actuator end portion 46 on the slide bar 43 projects upwardly through the aligned apertures 20, 21 in the sub-panel 4 and the top deck plate 3, it being noted that the apertures 20, 21 are of a size and configuration to permit reception of the pressure roller 19, the capstan 17 and the actuator end portion 46. The actuator 46 defined by the slide bar 43 is disposed in the path of travel of the tape cartridge 10 and operated thereby when the cartridge 10 is inserted or placed upon the top deck plate 3. With this arrangement, the slide bar 43 and the actuator 46 defined thereby are mounted for movement in a direction generally parallel to the cartridge guide flange 33 and generally perpendicular to the axis of the rockshaft 39. The actuator 46 is provided with an adjustment screw and nut, as at 47, in order to permit adjustment of the relative locations of the cartridge 10 and the pressure roller 19 when in its near operative position.

In accordance with this invention, novel connecting means is provided for translating the lineal movement of the slide bar 43 into rotary or rocking movement of the rockshaft 39. Accordingly, an angle-shaped pitman rod 48 is disposed with a horizontal portion thereof journalled within a bearing plate 49 rigidly secured to the slide bar 43 with the axis of rotation of the pitman rod 48 being parallel to the axis of the rockshaft 39. A depending portion 50 of the pitman rod 48 is received within a diametrically extending bore defined by a reduced intermediate portion 51 of the rockshaft 39. With this arrangement, the cartridge actuated lineal sliding movement of the slide bar 43 is transferred to arcuate swinging movement of the rockshaft 39 and the pressure roller 19 in such a manner that the initial portion of the pressure roller movement adjacent its complete inoperative position, shown by dotted lines in FIG. 5, and the final portion of the pressure roller movement adjacent its near operative position, shown by dotted lines in FIG. 6, are at relatively slower rates than the intermediate pressure-roller movement between the two extremes.

Figures 6, 7:
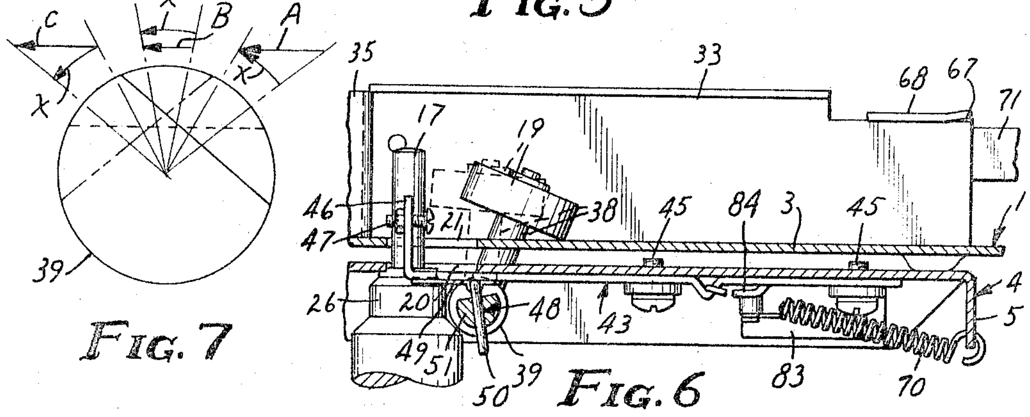
FIG. 6 is a view corresponding to a portion of FIG. 5 but showing some parts thereof in different positions.
FIG. 7 is a diagrammatic view illustrating the movement of the pressure roller and connecting mechanism at various positions.
Figure 8:
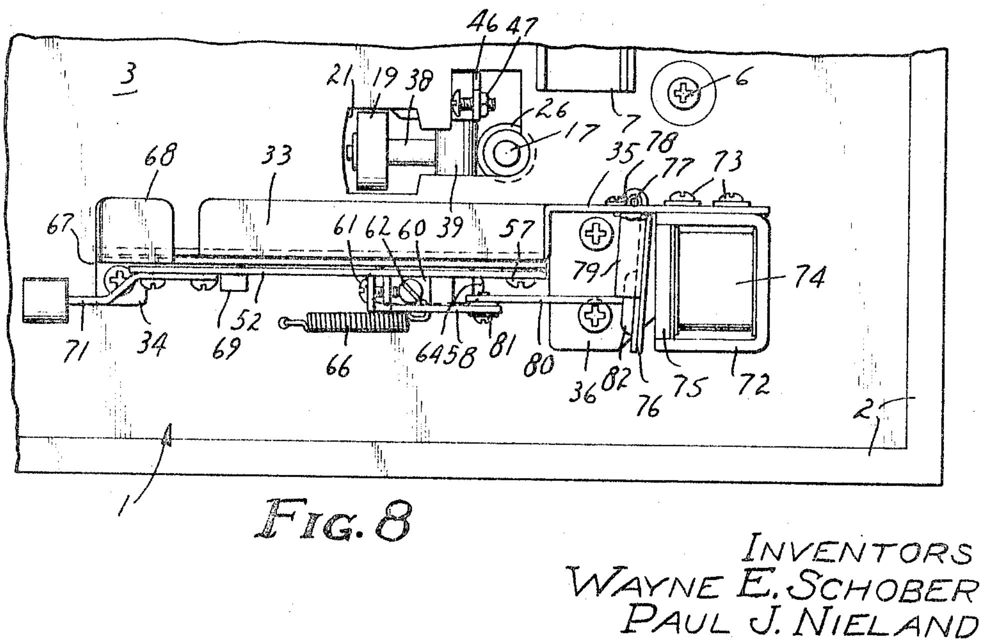
FIG. 8 is a view of a portion of the structure in top plan and showing an alternative position of some parts from that shown in FIG. 1.

As illustrated in FIG. 7, the pressure roller 19 moves throughout approximately 90°, and when the initial portion of the pressure roller movement is begun, a length of lineal movement of the slide bar represented by the arrow A imparts arcuate movement to the pressure roller 19 throughout the angle X. However, upon continued rotation of the rockshaft 39, the lineal slide bar movement is applied to the depending portion 50 of the pitman rod 48 slidably connected to the rockshaft 39 in a direction generally perpendicular to the depending pitman rod portion 50 so that the amount of swinging movement of the pressure roller 19 at this point is approximately equal to the amount of lineal movement of the slide bar 43, the corresponding intermediate position of the pressure roller 19 being shown by full lines in FIG. 6. Therefore, as represented in FIG. 7, when the pressure roller 19 is in an intermediate position, it only takes a relatively small lineal movement by the slide bar 43, represented by the arrow B, to produce an equivalent arcuate movement throughout the angle X. However, when the pressure roller 19 reaches its final portion of its movement so that the slide bar 43 is moving in a direction which again forms an acute angle with respect to the diameter of the rockshaft 39, it again takes a relatively great amount of straight line movement of the slide bar 43, represented by the arrow C to produce arcuate swinging movement of the rockshaft 39 throughout an equivalent angle X. Therefore, translating the length of the lines A, B, and C, shown in FIG. 7 into rates of movement relative to the constant length of angular movement X, it will be seen that the arcuate swinging movement imparted to the rockshaft 39 and the pressure roller 19, pursuant to the cartridge actuated lineal movement of the slide bar 43, is relatively slow during the initial and final portions of the movement and relatively fast during the intermediate portion of the swinging movement. This provides an important advantage since when the cartridge 10 is inserted and the initial movement is imparted to the actuator 46 by the cartridge 10, it is relatively easy to start the pressure roller movement with little effort by the operator because of the mechanical advantage and the slow rate of initial pressure roller movement. Also, the final portion of the pressure roller movement into its near operative position adjacent the capstan 17 is at a relatively slow velocity so as to greatly reduce the inertia forces and the jarring or hard pressure roller engagement which might otherwise result and possibly damage the related mechanism.

Referring to FIG. 2, the means for releasably retaining the pressure roller 19 in its near operative position will be noted. Such means comprises an elongated lever bar 52 defining an elongated slot 53 at one end portion thereof which is received on a pin 54 and held thereon by means of a spring retainer nut 55 for limited sliding movements. The other end portion of the lever bar 52 defines an angle slot 56 received on the shank of a screw 57 secured to the adjacent portion of the guide flange 33. An intermediate portion of the lever bar 52 defines a laterally projecting angle bracket 58 having an elongated slot 59. An angular keeper element 60 has its vertical portion secured by means of an adjustment screw 61 to a vertical flange of the angle bracket 58, and a lock screw 62 projects through the slot 59 in the bracket 58 and is secured into a horizontal portion of the keeper element 60.

A radially extending latch arm 63 is secured to the other end portion of the rockshaft 39 and is adapted to project upwardly through aligned elongated apertures 64, 65 in the top deck plate 3 and the subpanel 4. The latch arm 63 has a beveled end portion which is adapted to ride upwardly by the edge of the keeper element 60 when the pressure roller 19 is moved to its near operative position, the keeper element 60 giving way to the latch arm 63 upon sliding upward movement of the lever bar 52 about the pin 54 and against the bias of a coil spring 66 extending to the top deck plate 3. With this arrangement, the latch arm 63 moves by the keeper element 60 to attach behind the end edge of the keeper element 60 which is biased in a generally downward direction by means of the coil spring 66, whereby the pressure roller 19 is retained in its near operative position.

In order to permit release of the pressure roller 19 from its near operative position, a first release lever 67 is disposed intermediate the lever bar 52 and the guide flange 33 and has its rear end portion pivotally mounted on the mounting screw 57. The release lever 67 has a lateral flange 68 which extends inwardly over the guide flange 33 and also has a laterally projecting lug 69, which extends underneath the lever bar 52, whereby upon lifting the tape cartridge 10 away from the top deck plate 3, the lateral flange 68 will lift the release lever 67 and the lever bar 52 to permit the latch arm 63 to drop by or disengage from the keeper element 60. In this connection, it is noted that a coil spring 70 secured between the latch bar 43 and a depending flange 5 of the sub-panel 4 biases the slide bar and the pressure roller 19 to its inoperative below-deck position upon release of the latch arm 63. An alternative means is provided for lifting the lever bar 52 and releasing the latch arm 63, and this is an extension lever 71 on the end of the lever bar 52, which when depressed in a downward direction will raise the other end of the lever bar 52 about the pin 54 and permit release of the latch arm 63. While it is noted that the first release lever 67 provides automatic means for releasing the pressure roller 19 to its inoperative below-deck position when the cartridge 10 is lifted for removal from the machine, the extension lever 71 also provides direct manual release means movable in a downward direction generally opposite to the releasing movement of the first lever 67.

The present invention also comprises an associated mechanism for moving the pressure roller 19 between its intermediate near operative position shown by dotted lines in FIG. 6 and an operative tape driving position shown by dotted lines in FIG. 5. Such means for accomplishing this final portion of the pressure roller movement is referred to herein sometimes as second pressure roller control means in the form of an electromagnetic actuator. The electromagnetic actuator comprises a U-shaped core bracket 72 rigidly secured by suitable screws 73 to the offset rear portion 35 of the guide flange 33. It will be understood that the electromagnet also comprises a central core, not shown, and a helical coil or solenoid, noted at 74, wound thereon. A resilient cushion plate 75 formed of rubber or other suitable material is positioned between the space pole ends of the core bracket 72.

A movable armature plate 76 is pivotally mounted adjacent the cushion plate 75 by means of a vertical rod 77 secured to the rear portion 35 of the guide flange 33 by means of a bearing bracket 78. The armature plate 76 defines spaced ears 79 which are received on the opposed end portions of the rod 77 whereby the armature plate 76 is mounted for pivotal movements toward and away from the electromagnet. Of course, the core bracket 72 and the armature plate 76 are formed from magnetic fluxconducting material. The armature plate 76 is connected to an extension arm defined by the angle bracket 58 of the lever bar 52 by means of a connecting link 80 and a pivot screw 81. The other end portion of the connecting link 80 is connected in a recess defined by a boss 82 on the magnetically responsive armature plate 76.

When the electromagnet is energized, the magnetically responsive armature plate 76 pivots about its mounting to the rod 77 and is drawn into engagement with the ends of the core bracket 72 against the cushion plate 75, whereby the connecting link 80 draws the keeper element 60 against the latch arm 63 on the rockshaft 39 to further rotate the rockshaft 39 and the pressure roller 19 into the operative tape driving position, wherein the pressure roller 19 presses against the capstan 17. The adjustment screw 62 for the keeper element 60 provides means for adjusting the operative position of the pressure roller 19 whereby the same may be adjusted for parallelism between the respective axes of the pressure roller 19 and the capstan 17.

As shown particularly in FIGS. 4 and 5, a micro-switch 83 is secured beneath the sub-panel 4 and is actuated by a raised lug 84 formed in slide bar 43 when the slide bar 43 and the pressure roller 19 are moved to the near operative position of the pressure roller 19 so as to energize the electric motor 22 for driving the capstan 17.

Figure 10:
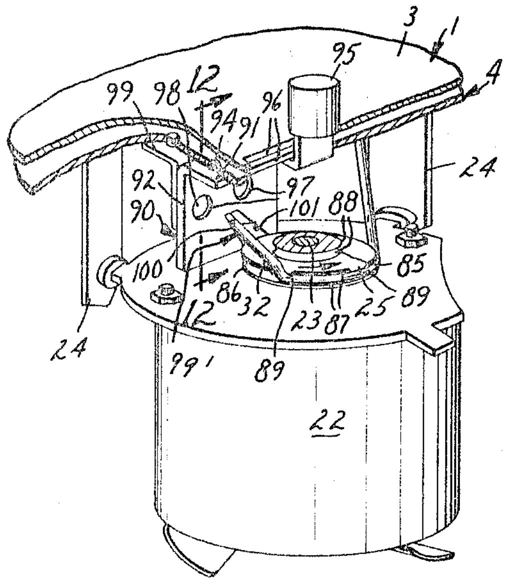
FIG. 10 is a detailed view in perspective showing the speed change and shift mechanism of the capstan drive.
Figure 11:
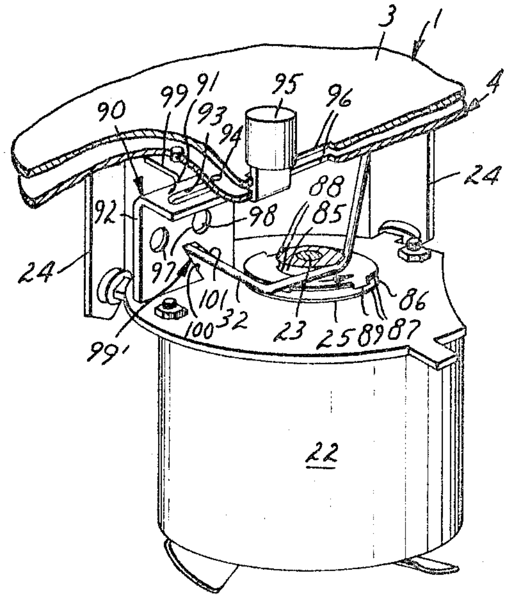
FIG. 11 is a view corresponding to FIG. 10 but showing alternative positions of some parts thereof.

As shown particularly in FIGS. 10 and 11, the pulley 25 on the drive shaft 23 of the motor 22 is a two-step pulley having a pair of axially spaced annular pulley grooves of different diameters, the smaller groove being denoted by the numeral 85 and a larger groove by the numeral 86. The larger pulley groove 86 is defined by radially outwardly extending annular edge flanges 87, and a smaller pulley groove is also defined by radially outwardly extending annular edge flanges 88, the inner one of which extends into the side of the larger pulley groove 86. The inner edge flange 87 of the larger pulley groove defines a plurality of circumferentially spaced slots 89 which interrupt the barrier formed by the edge flange 87 between the pulley grooves 85 and 86. In order to provide a speed change mechanism for changing the speed of the capstan for driving tapes adapted to be played at different tape speeds, a shift member 90 is provided for changing the drive belt 32 between the steps or grooves 85, 86 of the motor pulley 25.

Figures 9, 12:
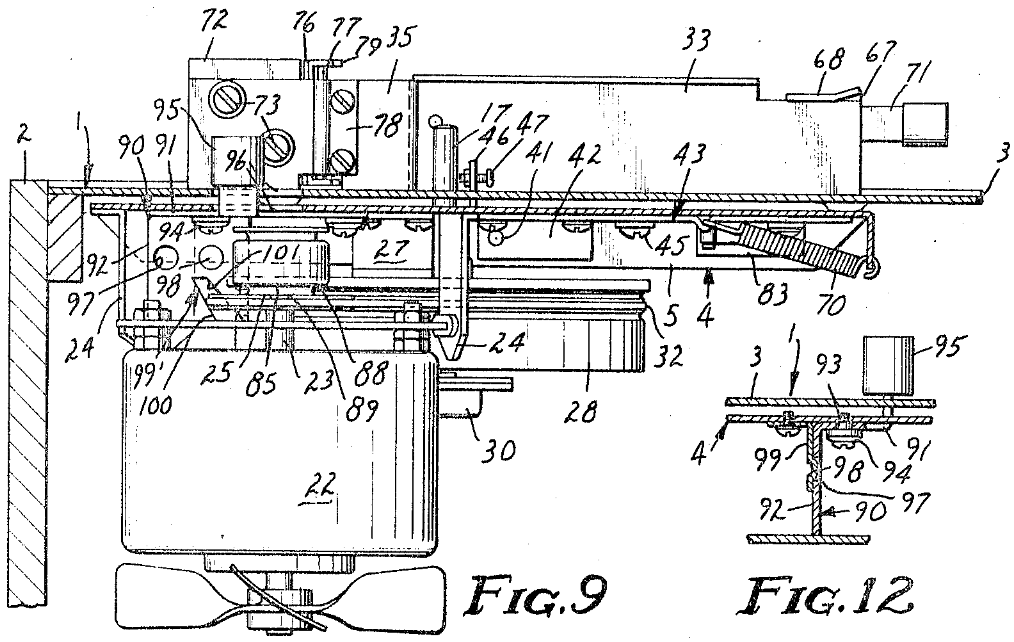
FIG. 9 is an enlarged view in section taken on the line 9—9 of FIG. 1.
FIG. 12 is a detailed view in section, taken on the line 12—12 of FIG. 10.

The shift member 90 is angularly shaped and defines a horizontal flange portion 91 and a depending vertical flange portion 92. The horizontal flange portion 91 of the shift member 90 defines a pair of longitudinally aligned elongated slots 93 in which are received a pair of shoulder screws 94 for mounting the shift member 90 beneath the sub-panel 4 for shifting or sliding movements between alternative positions. The member 90 also defines a shift lever 95 which projects upwardly through a pair of aligned elongated apertures 96 defined in the sub-panel 4 and the top deck plate 3. With this arrangement, the shift member 90 is mounted for sliding or shifting movements in opposite directions extending generally transversely of one of the flights of the belt 32 extending between the pulley 25 and the flywheel 28. The inner position of the shift member 90 is shown in FIG. 10, and the outer position thereof is shown in FIG. 11. The vertical flange 92 of the shift member 90 defines a pair of spaced apertures 97 adapted to receive a detent 98 defined by a leaf spring 99 secured to the sub-panel 4 adjacent the shift member 90, as shown particularly in FIG. 12, whereby the shift member 90 is biased or releasably retained in both of its inner and outer positions. The vertical flange 92 of the shift member 90 also defines an elongated slot 99′ having opposed elongated belt-engaging portions 100 and 101 which extend in oblique inwardly declining directions with respect to the axis of the motor shaft. As shown particularly in FIG. 10, the belt-engaging portion 100 of the shift member slot 99′ is disposed and arranged to engage the adjacent flight of the belt 32 when the shift member 90 is in its inner position whereby to bias the belt flight to engage or catch in one of the slots 89 of the large pulley groove 86, whereby upon continued rotation of the pulley 25 in the direction indicated by the arrow in FIG. 10, the belt 32 will be transferred or shifted to the smaller pulley groove 85.

As shown in FIG. 11, when the shift member 90 is in its outer position, the belt-engaging portion 101 of the slot 99′ is disposed and arranged to bias or depress outwardly the adjacent flight of the belt 32 whereby the same catches in or is engaged by one of the slots 89 so that upon continued rotation of the pulley 25 in the direction indicated by the arrow in FIG. 11, the belt 32 will be transferred or shifted outwardly to the larger pulley groove 86. It will be appreciated that the speed change or shifting mechanism described above provides an exceedingly simple and efficient mechanism for changing the speed of capstan rotation for use with tapes adapted to be played at different tape speeds.

The operation and function of the various parts and elements of this invention has been noted along with the detailed description provided above, and it will be further noted that the tape driving mechanism of the present invention is relatively simple and efficient in design so as to lend itself to economical production. The present invention has been thoroughly tested and found to have the definite advantages noted previously; and while a preferred embodiment illustrating the principles of the present invention has been described and shown, it should be specifically understood that the same could be modified without departure from the scope and spirit of the appended claims.

What we claim is:

1. In a magnetic tape cartridge handling machine:

(a) a deck structure having a tape cartridge supporting surface, (b) tape driving mechanism comprising a power driven capstan and a cooperating idle pressure roller, (c) a rockshaft mounted for rocking movements about an axis that is generally normal to the capstan axis and is radially spaced from the capstan axis, (d) means mounting the pressure roller on the rockshaft for arcuate swinging movements about the axis of the rockshaft toward and away from the capstan between an operative tape driving position and an inoperative position, and (e) pressure roller control means comprising:

(1) a slide mounted below said deck and having an actuator projecting upwardly through an aperture in said deck and disposed in the path of travel of a tape cartridge received on said surface whereby sliding movements of said cartridge impart lineal sliding movements to said slide, (2) a pitman rod connecting said slide to the rockshaft for causing said rocking movement of the rockshaft upon cartridge actuated lineal movement of said slide so as to impart said arcuate swinging movements to the pressure roller, and (3) means for releasably retaining the pressure roller in its said operative position.

2. In a magnetic tape cartridge handling machine:

(a) a supporting structure defining a tape cartridge supporting surface;

(b) tape driving mechanism comprising a power driven capstan and a cooperating idle pressure roller, (c) a rock shaft mounted for rocking movements about an axis that is generally normal to the capstan axis and is radially spaced from the capstan axis;

(d) means mounting the pressure roller on the rock shaft for arcuate swinging movements about the axis of the rock shaft toward and away from the capstan between an operative tape driving position and an inoperative position; and (e) pressure roller control means comprising:
(1) a movable actuator mounted in the path of travel of a tape cartridge and operated by sliding movements of the cartridge,
(2) means connecting said actuator to the rock shaft for causing rotary movement of the rock shaft upon cartridge actuated linear movement of the actuator to impart said arcuate swinging movements to the pressure roller and whereby the final portion of the pressure roller movement adjacent its operative position is at a relatively slower rate than the preceding pressure roller movement from the inoperative position, and
(3) means for releasably retaining the pressure roller in its said operative position.

3. In a magnetic tape handling machine:
(a) a supporting structure defining a tape cartridge supporting surface;
(b) tape driving mechanism comprising a power driven capstan and a cooperating idle pressure roller;
(c) a rock shaft mounted for rocking movements about an axis that is generally normal to the capstan axis and is radially spaced from the capstan axis;
(d) means mounting the pressure roller on the rock shaft for arcuate swinging movements about the axis of the rock shaft toward and away from the capstan between an operative tape driving position and an inoperative position; and
(e) pressure roller control means comprising:
(1) a slide bar mounted on said supporting structure,
(2) an actuator projecting from said slide bar into the path of travel of a tape cartridge and causing sliding movement of said bar in response to sliding movements of the cartridge,
(3) a pit man rod connecting the slide bar to said rock shaft for causing rotary movement of the rock shaft upon cartridge actuated lineal movement of the actuator, and
(4) means for releasably retaining the pressure roller in its said operative position.

4. In a magnetic tape cartridge handling machine:
(a) a supporting structure defining a tape cartridge supporting surface;
(b) tape driving mechanism comprising a power driven capstan and a cooperating idle pressure roller;
(c) a rock shaft mounted for rocking movements about an axis that is generally normal to the capstan axis and is radially spaced from the capstan axis;
(d) means mounting the pressure roller on the rock shaft for arcuate swinging movements about the axis of the rock shaft toward and away from the capstan between an operative tape driving position and an inoperative position; and
(e) pressure roller control means comprising;
(1) a movable actuator mounted in the path of travel of a tape cartridge and operated by sliding movements of the cartridge,
(2) means connecting said actuator to the rock shaft for causing rotary movement of the rock shaft upon cartridge actuated lineal movement of the actuator to impart said arcuate swinging movements to the pressure roller and whertby the final portion of the pressure roller movement adjacent its operative position is at a relatively slower rate than the preceding pressure roller movement from the inoperative position, and
(3) means for releasably retaining the pressure roller in its said operative position, said releasable retaining means comprising:
(a) a latch arm secured to said rock shaft and movable therewith to a latched position corresponding to the operative position of the pressure roller,
(b) a keeper element spring biased into engagement with said latch arm for releasably retaining the same in its said latched position, and
(c) a release lever operatively coupled to said keeper element and engageable by the tape cartridge for moving the keeper element out of engagement with the latch arm upon upward movements of the tape cartridge away from the cartridge supporting surface.

5. In a magnetic tape cartridge handling machine:
(a) a supporting structure defining a tape cartridge supporting device;
(b) tape driving mechanism comprising a power driven capstan between an operative tape driving position
(c) a rock shaft mounted for rocking movements about an axis that is generally normal to the capstan axis and is radially spaced from the capstan axis;
(d) means mounting the pressure roller on the rock shaft for arcuate swinging movements about the axis of the rock shaft toward and away from the capstan between an operative tape driving position and an inoperative position; and
(e) pressure roller control means comprising:
(1) a movable actuator mounted in the path of travel of a tape cartridge and operated by sliding movements of the cartridge,
(2) means connecting said actuator to the rock shaft for causing rotary movement of the rock shaft upon cartridge actuated lineal movement of the actuator to impart said arcuate swinging movements to the pressure roller and whereby the final portion of the pressure roller movement adjacent its operative position is at a relatively slower rate than the preceding pressure roller movement from the inoperative position, and
(3) means for releasably retaining the pressure roller in its said operative position, said releasable retaining means comprising:
(a) a latch arm secured to said rock shaft and movable therewith to a latched position corresponding to the operative position of the pressure roller,
(b) a keeper element spring biased into engagement with said latch arm for releasably retaining the same in its said latched position, and
(c) a pair of release levers both of which are operatively coupled to said keeper element and which provide alternative means for moving the keeper element out of engagement with the latch arm, one of said release levers being engaged and operated upon upward movement of the tape cartridge away from the cartridge supporting surface and the other of said release levers being arranged for direct manual operation and movable in a direction generally opposite to the releasing movement of said one lever.

6. In a magnetic tape cartridge handling machine:
(a) a supporting structure defining a tape cartridge supporting surface;
(b) tape driving mechanism comprising a power driven capstan and a cooperating idle pressure roller;
(c) a rock shaft mounted for rocking movements about an axis that is generally normal to the capstan axis and is radially spaced from the capstan axis;
(d) means mounting the pressure roller on the rock shaft for arcuate swinging movements about the axis of the rock shaft toward and away from the capstan between an operative tape driving position and an extreme inoperative position;

(e) first pressure roller control means operative to move the pressure roller from its said extreme inoperative position to and releasably retain it in a near operative position wherein it is disposed closely adjacent the capstan but is sufficiently spaced therefrom to produce no frictional driving pressure between the capstan and a cartridge carried tape interposed between the capstan and the pressure roller, said first pressure roller control means comprising:

(1) a movable actuator mounted in the path of travel of a tape cartridge and operated by sliding movements of the cartridge, (2) means connecting said actuator to the rock shaft for causing rotary movement of the rock shaft upon cartridge actuated lineal movement of the actuator to impart said arcuate swinging movements to the pressure roller and whereby the final portion of the pressure roller movement adjacent its near operative position is at a relatively slower rate than the preceding pressure roller movement from the extreme inoperative position, and (3) means for releasably retaining the pressure roller in its said near operative position; and (f) second pressure roller control means which is operative to move the pressure roller from its said intermediate near operative position to and releasably retain it in its said operative tape driving position, the second pressure roller control means being an electromagnetic actuator comprising:

(1) a solenoid fixedly mounted on the supporting structure of said machine, and (2) a magnetically responsive armature disposed for swinging movements toward and away from said solenoid and coupled to said rock shaft for actuating the same in response to said solenoid actuated movement of the armature.

7. In a magnetic tape handling machine:

(a) a tape driving capstan having a fly wheel;

(b) a motor for driving said capstan and having a shaft disposed in spaced generally parallel relation to the axis of said capstan;

(c) a two-step pulley secured on said motor shaft and having a pair of axially spaced annular pulley grooves of different diameters, said grooves being defined by radially outwardly extending generally annular edge flanges, the edge flange of the larger pulley groove disposed adjacent the smaller pulley groove defining a circumferentially disposed slot;

(d) a flexible endless drive belt entrained around said motor pulley and also around the periphery of said capstan fly wheel to define a pair of belt flights extending between said pulley and said fly wheel;

(e) a shift member for changing the position of said belt and adapted to engage one of the flights of said belt, (f) means mounting said shift member on said machine for movement in opposite directions extending generally transversely of said one belt fight and between inner and outer positions wherein said belt catches in the slot of said larger pulley groove and in transferred from one of said pulley grooves to the other thereof upon continued rotary movement of said motor pulley, and (g) said shift member defining a slot having opposed elongated belt engaging portions one of which is disposed to engage said one belt flight when said member is in its inner position so as to bias said one belt flight to catch in said slot in said larger pulley groove for transfer to said smaller pulley groove and the other of said belt engaging portions being disposed to engage said one belt flight when said member is in its outer position so as to bias said one belt flight to catch in said slot in the larger pulley groove for transfer to said larger pulley groove, and said elongated belt engaging portions extending in oblique directions with respect to the axis of said motor shaft.

References Cited by the Examiner

UNITED STATES PATENTS

| | | | |
|---|---|---|---|
| 1,471,726 | 10/1923 | Gintz | 74—242.4 |
| 2,377,697 | 6/1945 | Kenworthy | 74—242.4 |
| 3,023,943 | 3/1962 | Schober | 242—55.13 X |
| 3,027,112 | 3/1962 | Flan | 242—55.19 |
| 3,037,088 | 5/1962 | Berger et al. | 226—178 |
| 3,096,920 | 7/1963 | Schober | 226—180 X |
| 3,113,708 | 12/1963 | Moulic | 242—55.19 |
| 3,154,956 | 11/1964 | Eash | 226—181 X |

FOREIGN PATENTS 1,071,437 12/1959 Germany.

M. HENSON WOOD, Jr., *Primary Examiner.*

A. N. KNOWLES, *Assistant Examiner.*